Dec. 19, 1944.  G. E. KING ET AL  2,365,558
CONTROL FOR MACHINE TOOLS
Filed Aug. 20, 1943  5 Sheets-Sheet 1

WITNESSES:
E. A. McCloskey
New. C. Groome

INVENTORS
George E. King and
Oren G. Rutemiller.
BY
Paul E. Friedemann
ATTORNEY

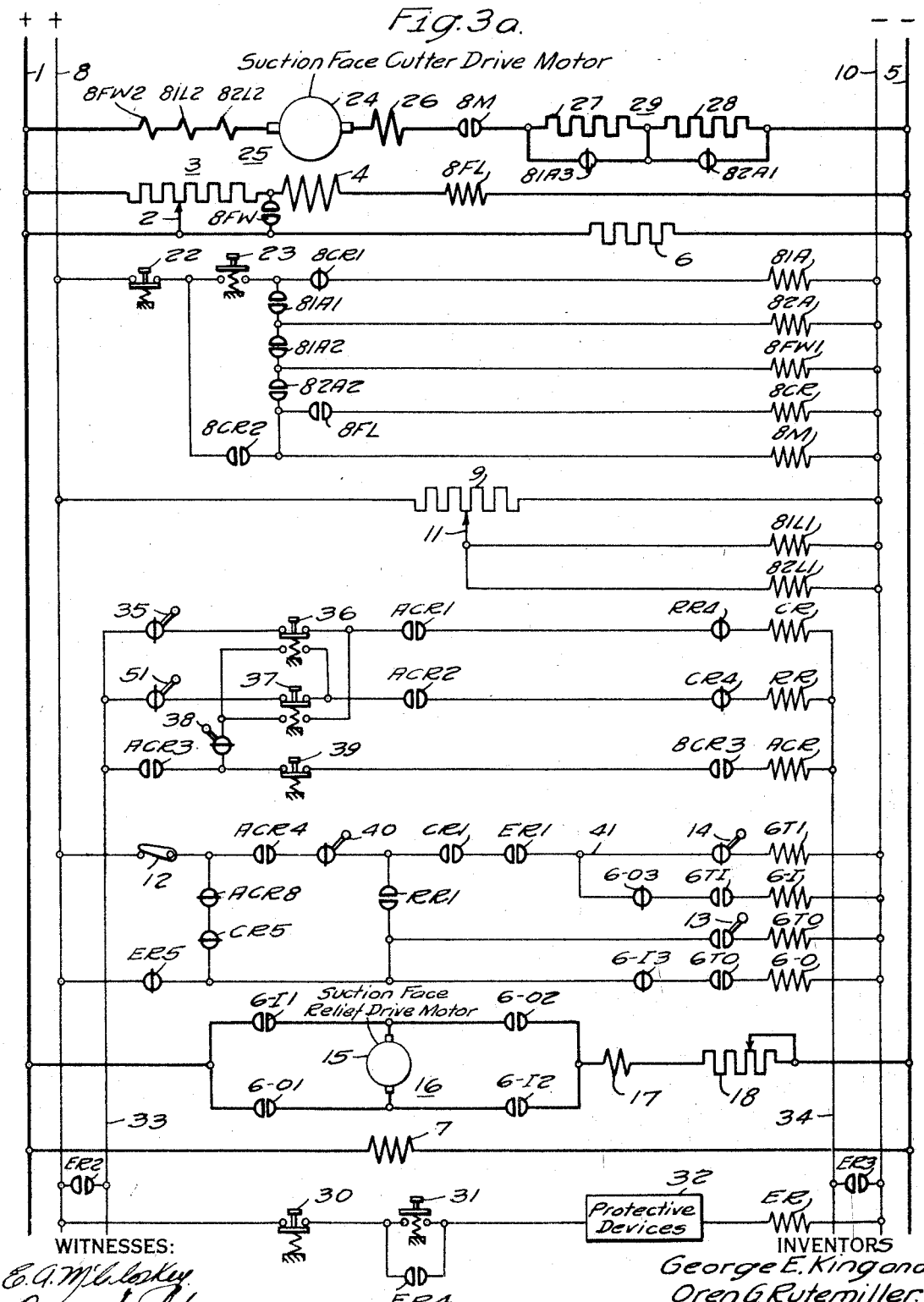

Dec. 19, 1944.   G. E. KING ET AL   2,365,558
CONTROL FOR MACHINE TOOLS
Filed Aug. 20, 1943   5 Sheets-Sheet 4

WITNESSES:
E. A. McCloskey
N. C. Groome

INVENTORS
George E. King and
Oren G. Rutemiller.
BY
Paul E. Friedemann
ATTORNEY

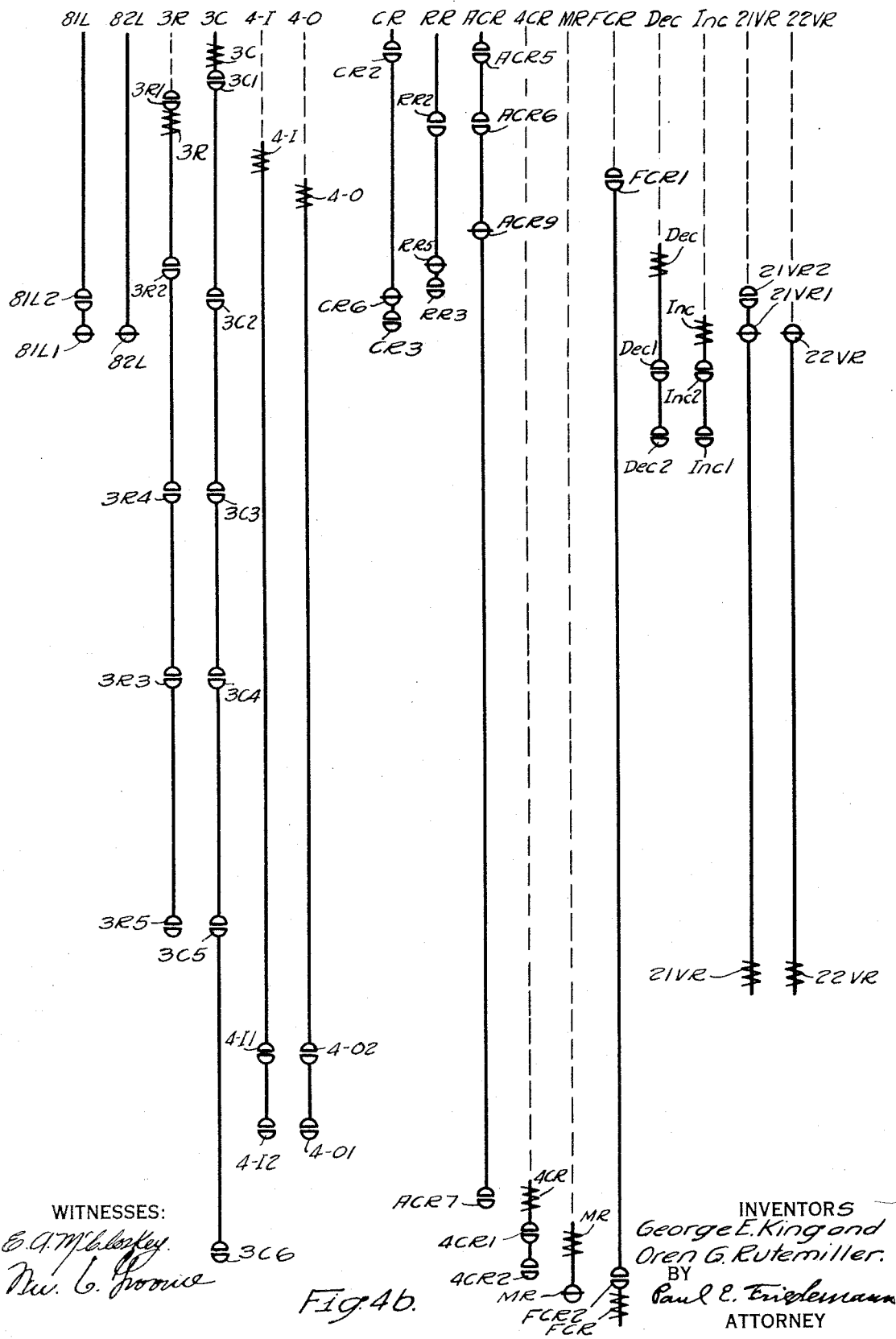

Patented Dec. 19, 1944

2,365,558

UNITED STATES PATENT OFFICE 2,365,558

CONTROL FOR MACHINE TOOLS

George E. King, Wilkinsburg, Pa., and Oren G. Rutemiller, Cincinnati, Ohio, assignors to Westinghouse Electric & Manufacturing Company, East Pittsburgh, Pa., a corporation of Pennsylvania Application August 20, 1943, Serial No. 499,330

26 Claims. (Cl. 172—239)

Our invention relates to a system of control for motors and, more particularly, to systems of control for a plurality of motors operating a machine operating on a workpiece.

Our invention more particularly embodies a variable voltage drive for a machine operating a workpiece, wherein the speed of operation, in addition to being accurately maintained to given selected speed values corresponding to the speeds of operation selected, makes such speeds of operation a function of the load on a second machine operating on the workpiece.

In a conventional variable-voltage control, the motor is ordinarily provided with a separately excited field winding, and the desired direction of rotation of the motor is effected by reversing the polarity of the energy supplied to the motor armature. The motor is arranged to be energized from a generator which may be provided with a series field winding to compensate for the IR drop in: the generator armature circuit; the armature circuit of the motor; the series field winding itself; and the leads interconnecting the generator and motor armatures. The generator is provided with a separately excited main field winding, the current through which is arranged to be controlled and reversed in order to operate the motor, and thus the motor load attached thereto, at various speeds in either direction of travel. The excitation of the main field winding of the generator may be controlled by means of a rheostat or the combination of various resistors and suitable control devices for inserting various steps of resistance in circuit with the main field winding. For each position of the controller controlling the field current in the generator, there is a particular speed of operation of the motor that is desired. Any departure in speed from the desired value introduces undesirable operations of the load. If it were possible to maintain all of the conditions affecting such a control constant, the desired operation could be secured with the simple conventional variable-voltage control just briefly explained.

In addition, if the speed of such a motor has to be varied as a function, not of its own load, but the load, or other characteristic, of some other motor, then variations in its own inherent operating characteristics makes it almost impossible to determine the actual motor characteristics.

Since it is manifestly impossible to maintain all the conditions affecting such a variable-voltage control constant, we use, with such a control, a regulator-generator having a series field winding arranged to be responsive to the current supplied to the motor, and a main, or shunt field winding arranged to be responsive to the voltage applied to the motor. These field windings are differentially related to each other and are so disposed with reference to each other that the regulator-generator, in operation, generates a voltage which is a function of the speed of the motor, and the load carried by the motor. Differential field windings are also provided on the regulator-generator and are connected, respectively, in series circuit relation with the main field windings of the generator for opposing the combined action of the series and shunt field windings. The armature of the regulator-generator is arranged to be connected in circuit relation with these regulator-generator differentially related field windings and the field windings of the generator and is connected in series with a motor-operated controller. The motor for the controller is operated in dependence upon the load of some other motor. The final excitation of the main generator and thus the speed of the main motor connected to it may thus be accurately determined at each instant by the controller position at that instant. Where this controller changes its operating effect, as is the case in the application herein discussed, the motor nevertheless follows the changing speed settings thus being made independent of: the load on the main motor; the ambient temperature; the direction of operation of the motor; the rapidity of the voltage reversals on the motor terminals; and independent of other factors that would ordinarily prevent the desired operation of the motor.

Further by a proper selection of the constants of the electrical units of a Wheatstone bridge, including the main field windings of the main generator, the differential field windings of the regulator-generator, the armature of the regulator-generator and resistors, the control effect of the regulator-generator can be made much faster and can be made substantially independent of the shape and slope of the curve indicating its saturation characteristics. Still other advantages may be obtained, which advantages will become more apparent from a study of the objects of my invention hereinafter stated and from the claims hereto appended.

A broad object of our invention is to provide a system of control for varying the voltage impressed on the armature terminals of a direct-current motor as a function of a given portion of the system and in such manner that the speed determined by said function is obtained in a relatively short time and is so maintained substantially independent of: the load on the motor; the direction of rotation of the motor; and any of the other factors that would ordinarily prevent operation of the motor in accordance with said function.

Another broad object of our invention is the provision of a system of control including, among other elements, at least two motors wherein the voltage impressed on the armature terminals of one motor is varied both in accordance with the operating characteristics of the other motor and in such manner that the voltage so impressed is independent of: the changes in temperature ambient to the first motor; variations in load of the first motor; direction of operation of the first motor; rapidity of reversal of the voltage on the armature terminals of the first motor; and other factors that would normally alter the speed of the first motor.

Another object of our invention is the provision of an electric system of control for motors operating a machine for shaping objects of metal or workpieces of other materials including, among other elements, at least two motors wherein the effective voltage impressed on the armature terminals of one motor is independent of the load on this said one motor, but wherein the effective voltage impressed on the armature terminals of the said one motor is made a function of the load current of the other motor.

It is also an object of our invention to provide an electric system of control for electric motors wherein the effective voltage impressed on one motor is made a function of the load current of a second motor and the angular position, with reference to an index, of the armature of a third motor.

A broad object of our invention is to control the speed of an electric motor as a function of the combined operating characteristics of two other motors, and independent individually and/or collectively of: the load on the first motor; the temperature ambient to the first motor; direction of operation of the first motor; and rapidity of reversal of the voltage on the armature terminals of the first motor.

The objects hereinbefore recited are merely illustrative. Many other objects and advantages will become more apparent from a study of the following specification and the accompanying drawings, in which:

Figs. 3a and 3b show our systems of control diagrammatically; and

Figure 3B:
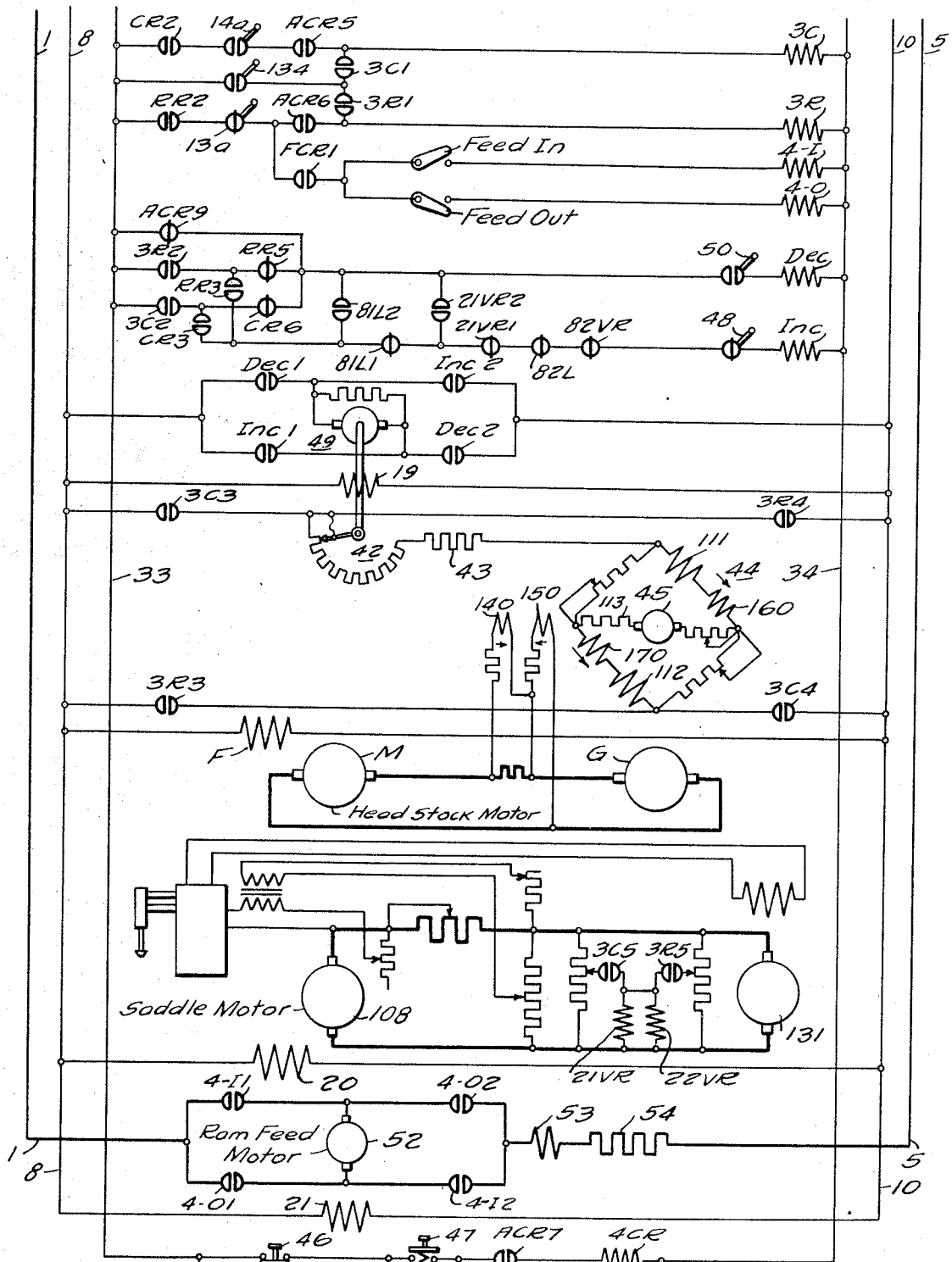
Figure 4A:
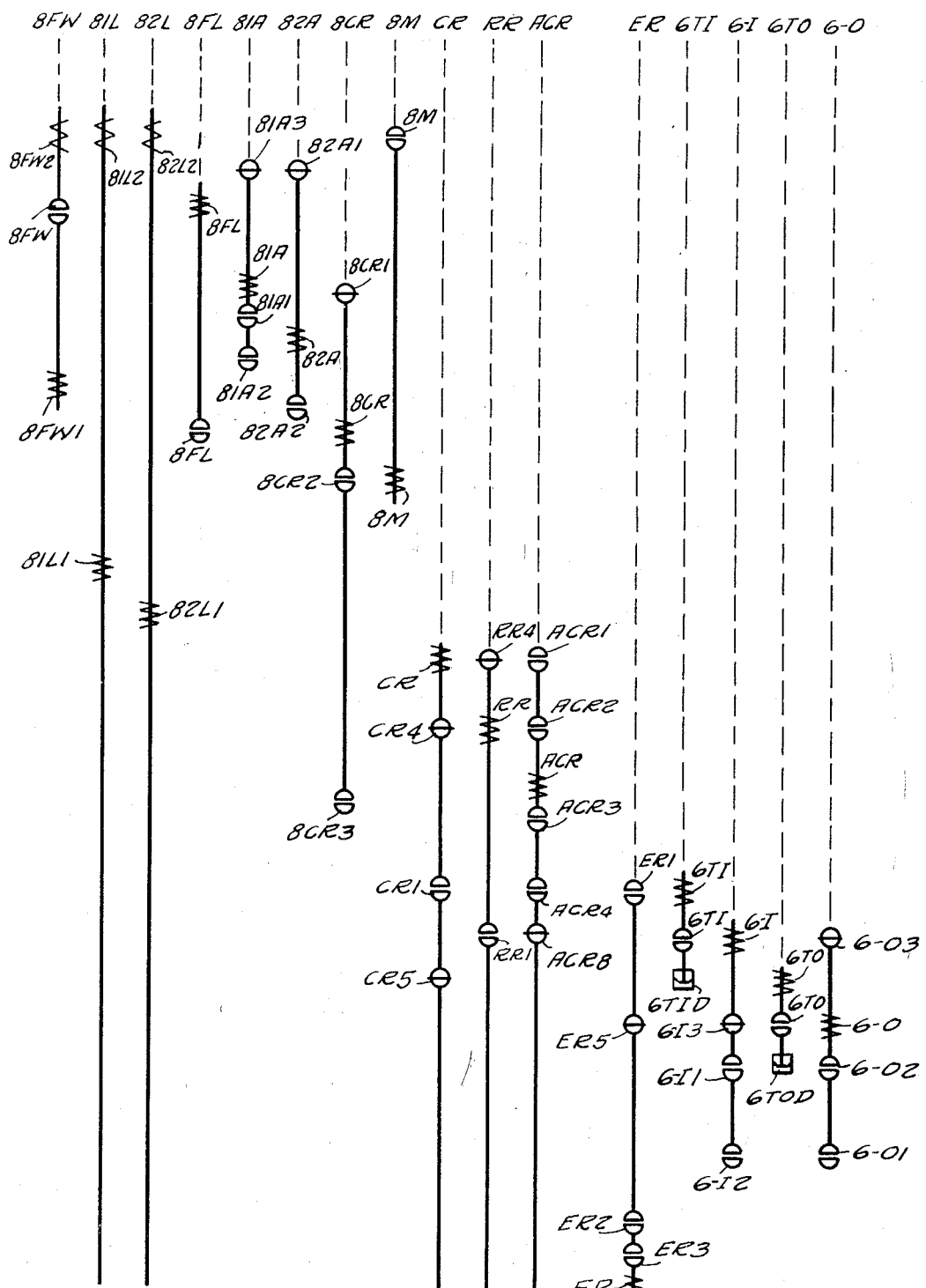

Figs. 4a and 4b schematically show the operating contactors and relays used in Figs. 3a and 3b, respectively.

Our systems of control, though not limited to the particular machine shown, are of particular utility with a propeller shaping machine.

Figure 1:
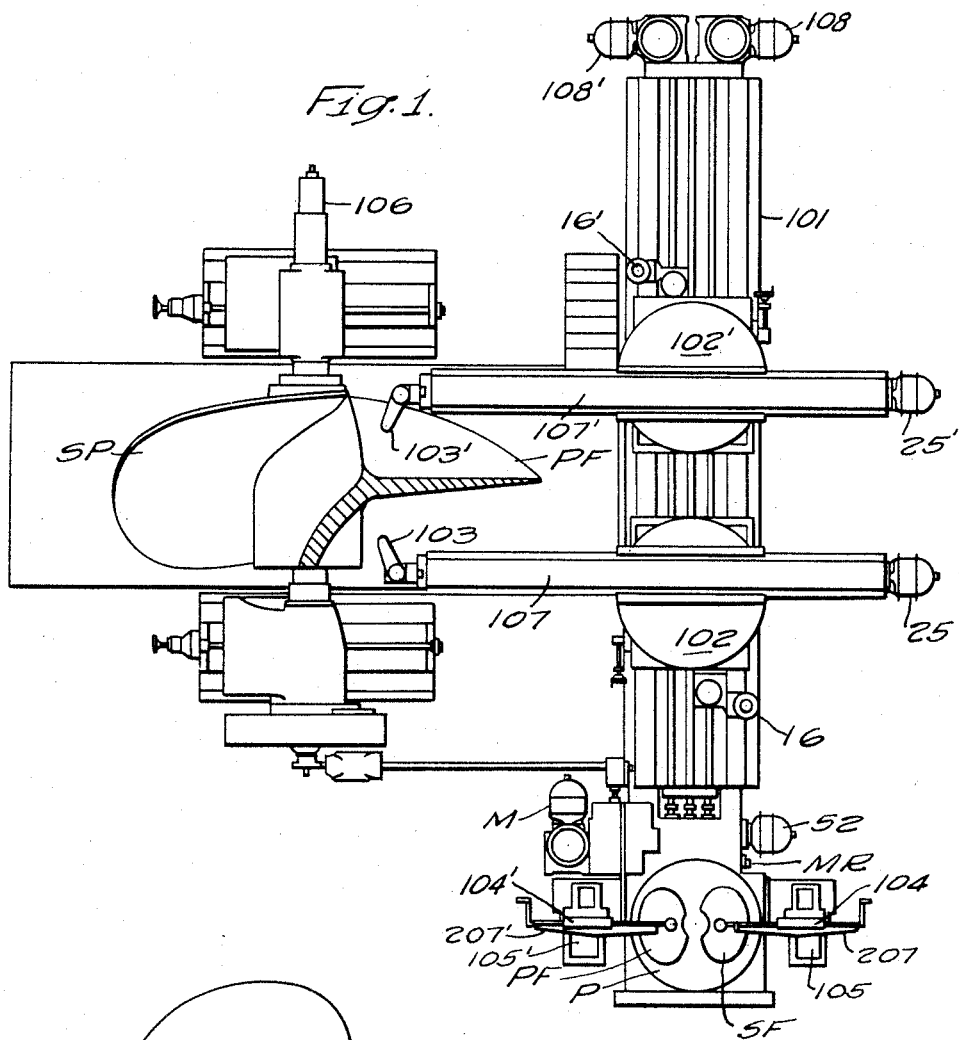
Figure 1 is a plan view of a ship propeller shaping machine provided with our systems of control.
Figure 2:
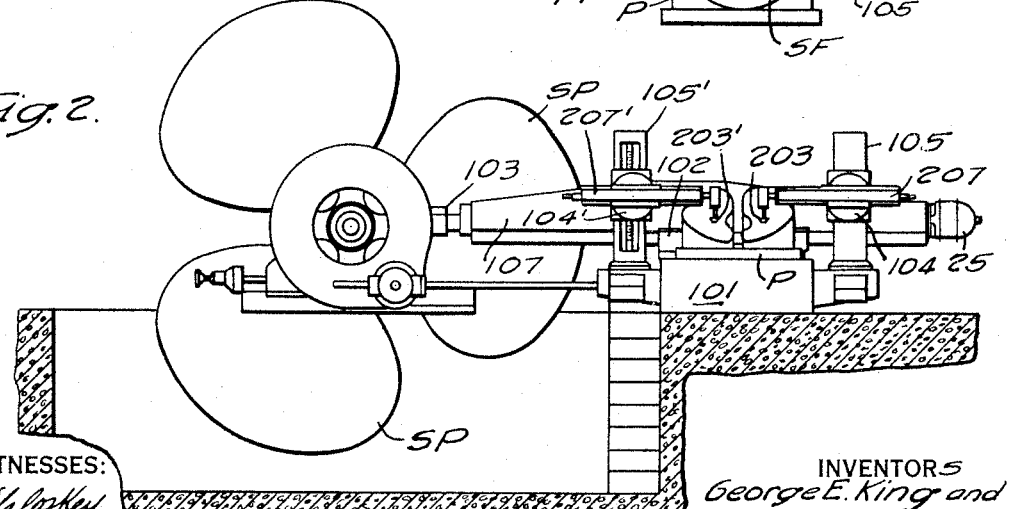
Fig. 2 is an end view of the machine shown in Fig. 1.

With the methods and apparatus of the prior art, the finishing of a screw propeller for a ship is a laborious time-consuming job, and frequently important ships are delayed for a considerable time while new screws are being made. The need for a machine that develops the contours of ship propellers accurately and quickly is thus apparent. The machine shown in Figs. 1 and 2 provides the mechanical elements for accomplishing such accurate and expeditious shaping of propellers provided the many motors needed to operate the various elements are properly controlled. Our systems of control provide such proper control.

The machine to which our control is applied is of the form following type, that is, one that produces the contour of a pattern or model in the metal of the propeller, or other workpiece. The machine provides for the machining of any contour on either side of the blade and the machining of any number of propellers with either right-hand or left-hand pitch from the same pattern. All blades on a given propeller are duplicates but differ in shape on the pressure face surface and the suction face surface. Only two patterns are thus needed, namely, one for each blade face, and the propeller is indexed for each succeeding blade.

The models or patterns are made of some relatively soft and easily formed material, such as wood or soft brass, or some other soft metal. The tracer control sensitivity is such that only a small pressure of the tracer on the model is sufficient to control the follow-up operation of the saddle drive motor. To effect the proper control of the saddle drive motor, a position regulating system of the servo type is used in this machine. The detailed showing, description and claims of this position regulating system are presented in a copending application of Clinton R. Hanna and William O. Osbon, Serial No. 502,488, filed September 15, 1943, entitled Tracer controlled position finder, and assigned to the assignee of this case.

In this machine, two identical position regulators are needed—one normally being used to control the suction face saddle drive motor, and the other the pressure face saddle drive motor. In this showing, since our invention is complete without showing all of the complicated dual control for all the motors of the whole machine, only one position regulating control, namely, for the suction face saddle drive motor, is shown.

The position regulator consists essentially of a variable voltage drive, with the exciter (not shown) for the generator energized by a single stage direct current amplifier which derives its positioning stimulus from the tracer control. The control is entirely electrical and is such that the voltage of the generator, supplying say the suction face saddle drive motor, is varied from a maximum in one direction to a maximum in the other direction. The speed of the suction face saddle drive motor may thus be varied from 1000 R. P. M. forward to 1000 R. P. M. reverse without any loss of control in the region around zero speed. The tracer control is such that when the saddle and thus the cutter has followed each incremental movement of the tracer on the surface, then the excitation of the field is substantially zero. In short, for each reflecting movement of the tracer, the saddle is caused to move so that the tracer is again not deflected, is again at its zero speed position—has no zero error.

The tracer and saddle are both geared to the same motor. The gear ratio is, of course, different for the tracer than for the saddle since the model or pattern may be as small as one-fourth or even smaller than the size of the finished propeller.

The tracer control, showing resistors and transformers, etc., in includes sensitivity control means, accelerating control means, antihunting control means and other features which need not be discussed in detail in this case. It is sufficient to know that the motor in its rotation to drive the saddle say, of the suction face cutter follows the tracer accurately.

In Figs. 1 and 2, 101 designates the mount for the two saddles 102 and 102'. These saddles are moved longitudinally of the mount by motors 108 and 108'. The saddles in addition to being longitudinally movable are also rotatably mounted about vertical axes for purposes of properly positioning and adjusting the cutters 103 and 103', with reference to the workpiece as a ship propeller SP, and for other purposes.

In order that the ship propeller may be cut and shaped in strict accordance with the contours of a pattern P, saddles 104 and 104' are mounted for longitudinal movement on the columns or ways 105 and 105'. The saddles 104 and 104' also have adjustable rotary movement on axes normal to the columns. The columns 105 and 105' correspond in every respect to the two ways for saddles 102 and 102' on the bed 101. In fact, if desired, the ways 105 and 105' could be horizontal and the pattern P operated on a horizontal axis and not on a vertical axis, as shown.

The ship propeller is mounted on horizontal arbor 106 and, by means of motor M and suitable reduction gears and the control described more in detail hereinafter, rotates the propeller first in one direction through about 120° and then back through about 120°. The extent of the angular movement, of course, depends on the number of blades per propeller. For the cut direction of rotation, that is, when the cutters 103 and 103' are operating on the propeller to shape it, the speed of operation is relatively slow and varied as a function of the load on the cutter motors 25 and 25'.

The pattern P is also geared to motor M and rotates this pattern through about 180° back and forth while the propeller is moved through 120°. The angle of rotation for each will, of course, depend on the type of pattern used and on the number of blades per propeller.

Since the pressure face PF of a propeller blade is different from the suction face SF, only two pattern surfaces are needed. These pattern surfaces need not, however, be on opposite sides of a model propeller or pattern, but may be cut differently on the top surface of some soft easily shaped pattern metal or pattern wood, and may be on a much smaller scale than the actual propeller. The gear ratios selected for the drive from the same motor M for the propeller and the pattern, respectively, take care of the proper operation of the propeller and pattern.

The sequence, once the machine is set up, very briefly stated is as follows: With the cutters 103 and 103' and the tracers 203 and 203' assumed to be against the propeller SP and the pattern, respectively, ready for the first cut, the cutter motors 25 and 25' are set in operation, and then the motor M is caused to operate the propeller and the pattern. This operation of motor M is relatively slow for the cut direction and is made a function of the load of the most heavily loaded cutter motor. As the cut begins, the tracers traversing the pattern cause the operation of motors 108 and 108' to shift the saddles 102 and 102' and 104 and 104'. The tracers 203 and 203' are thus maintained against the pattern surfaces with a given pressure, and the cutters 103 and 103' maintain a substantially uniform cut on the propeller as it is rotated through one blade angle, which depends on the number of propeller blades per propeller.

At the end of the cut stroke, the cutters 203 and 203' are moved away from the propeller SP by motors 16 and 16', and the motor M is reversed and somewhat more rapidly returns the propeller and pattern to the initial position. Before a second cut is started, the ram feed motor 52 moves the rams 107 and 107' longitudinally to the new cutting position. Rams 207 and 207' are geared to motor 52 and are thus moved longitudinally to a position to scan new traces on the patterns. The amount of feed is governed by a measuring relay MR.

The cutters are then again moved to cutting positions and a new cut is made. The cycles are then repeated until the propeller is properly shaped.

In the detailed discussion given hereinafter of the starting and operation of the system, the coils of the various relays and contactors and their contacts will be designated by somewhat descriptive given reference characters in Figs. 3a and 3b, but in Figs. 4a and 4b, the coils and contacts of the various relays and contactors and the relays and contactors, as a whole, will be designated by the same respective reference characters. This very materially simplifies the discussion and facilitates the correlative study of Figs. 3a and 3b and Figs. 4a and 4b.

For instance, if in the following discussion a circuit is traced in Fig. 3a whereby relay CR is energized, it means that the operating coil of the cut return relay is energized. This relay as a whole, its coil, armature and contacts will all be designated CR. If this relay has more than one pair of contacts, as it actually has, then the contacts will be designated CR1, CR2, CR3, etc., until the whole group has been exhausted.

By merely holding Fig. 3a in edge registry with Figs. 4a and 3b in edge registry with Fig. 4b, the corresponding position of the coil of this relay can readily be seen on Figs. 3a and 3b. Further vertically along the armature, represented by a vertical line, or stem, on Fig. 4a and Fig. 4b, the various contacts operated by this relay may be noted. These respective contacts hold positions on Figs. 4a and 4b that correspond to the positions at which they again appear on Figs. 3a and 3b, respectively. It is, therefore, a simple matter, once a certain operating coil, say, in Fig. 3a is known to have been energized, to locate the coil on Fig. 4a and then, from the corresponding positions the contacts for this coil hold in the Figs. 3a and 4a, and Figs. 3b and 4b determine just what new circuits are made or interrupted.

Assuming it is desired to start the system, then suitable switches are operated to connect the main buses 1 and 5 to a suitable source of direct current. This source may be a main generator driven by a suitable alternating current motor as a synchronous motor or an induction motor connected to the main source of alternating current usually available about a plant.

By the energization of the main buses 1 and 5 the following circuits are immediately energized. One circuit may be traced from bus 1 through the adjustable lead 2 for adjusting the speed of the suction face cutter drive motor 25, some of the sections of the field rheostat 3, the field 4 for motor 25, and relay 8FL to bus 5. Resistor 6 is also energized. Resistor 6 is a discharge resistor for the field windings 4 and 7.

The energization of the main buses 1 and 5 also energizes the field winding 7 for the suction face relief drive motor 16. This energization of the field 7 is at a constant value and when the motor armature 15 is supplied with energy the cutters will immediately be moved away from the workpiece.

After the foregoing circuits are established, a suitable constant voltage control exciter, or constant voltage auxiliary direct current generator, is caused to operate. Auxiliary buses 8 and 10 are, for energization, connected to this control exciter (not shown).

Energization of these auxiliary buses 8 and 10 energizes the following circuits. One circuit may be traced from bus 8 through calibrating resistor 9 to bus 10. By an adjustable lead 11, coacting with resistor 9, the energization of the operating coils 81L1 and 82L1 of the cutter motor loading control relays 81L and 82L, respectively, are controlled. By suitable adjustment of this lead 11 on resistor 9, the two relays are calibrated and thus their respective pick-up and drop-out points are determined. The utility of this will become clearer as the description proceeds.

For automatic operation (the only operation we discuss in detail hereinafter) selector switch 12 will be closed. With this switch closed, a circuit is established from bus 8 through switch 12, back contacts ACR8 and CR5, the limit switch 13 and the actuating coil of relay 6TO to the bus 10. Before starting the whole machine, it is essential that the cutters are, at first, away from the propeller. On the assumption that the cutters happen to be "in," the limit switches 13a and 13 are assumed to be in the open and closed positions, respectively, and limit switches 14 and 14a are assumed to be in the closed and open positions, respectively, though actually shown otherwise.

Energization of relay 6TO causes the closing of the contacts 6TO, whereupon 6—0 is energized by a circuit from bus 8 through switch 12, contacts ACR8, CR5, 6—13 and 6TO, the directional contactor 6—0 to bus 10. Operation of 6—0 establishes a circuit from bus 1 through contacts 6—01, armature 15 of the suction face relief drive motor 16, contacts 6—02, the series field 17 and the adjustable resistor 18 to bus 5. Since the field 7 of this motor is energized the motor 16 operates to move the cutter 103 out, or away, from the workpiece. When the cutter 103 is moved out to its limit the limit switches 13a and 14 close and the limit switches 14a and 13 open. These are the positions shown. Since limit switch 13 is opened the suction face relief drive motor 16 is stopped, because relay 6TO and contactor 6—0 are deenergized.

The relay 6TO is provided with a dashpot 6TOD, or some other means, for permitting the relay to pull-in with no appreciable time constant, but when the limit switch 13 opens the contacts 6TO remain closed for a selected time long enough so as to cause a certain travel of motor 16 to its limit so that all the limit switches are operated.

Energization of buses 8 and 10 also energizes the field windings 19, F, 20 and 21 of the rheostat motor 49, head stock drive motor M, saddle drive motor 108, and ram feed drive motor 52, respectively. These fields are energized at constant values so that the motors, when fully energized, operate at constant speed.

All the motors have suitable manually operable switches (not shown) to facilitate setting up the system so that all parts, as, for example, the tracers are on the pattern and the cutters are adjacent the propeller blade, etc.

Since the control is alike for both cutter motors and other duplicate elements the description, in the main, is confined to the system including but one of each of the duplicate devices.

To proceed further with the starting of the system, push-button switch 23 is actuated to closed position. A circuit is thus established from bus 8 through the stop switch 22, starting switch or push button 23, back contact 8CR1, through coil 81A of the accelerating contactor 81A to bus 10.

Energization of coil 81A causes operation of this motor accelerating contactor to close contacts 81A1 and 81A2 and the opening of contacts 81A3. Closure of contacts 81A1 and 81A2 causes the energization of accelerating contactor 82A and of the field weakening relay coil 8FW1 of relay 8FW. Operation of the accelerating contactor 82A causes the opening of contacts 82A1 and the closing of contacts 82A2. Since contactor 8FL is at this stage energized and its contacts are closed, the closure of contacts 82A2 causes the energization of relay 8CR. This relay 8CR thereupon opens its contacts 8CR1 and closes its contacts 8CR2 and 8CR3.

An instant after the closure of contacts 82A2, the main line contactor coil 8M is also energized; and in consequence the circuit for the suction feed cutter drive motor 25 is established at substantially the instant the circuit for coil 81A is opened at contacts 8CR1. The circuit for this motor may be traced from bus 1 through the load current responsive coils 8FW2, 81L2, and 82L2, motor armature 24 of motor 25, series field 26, contacts 8M, and the accelerating resistors 27 and 28 of the starting rheostat 29 to bus 5.

Since both coils of the field weakening relay 8FW are thus energized, the contacts 8FW of this relay are closed; and in consequence field 4 is heavily energized to give the motor 25 a desired heavy starting torque.

The contacts 8CR2 provide a holding circuit for the main motor contactor coil 8M so that switch 23 may be released. After a given time 81A drops out closing contacts 81A3 and resistor 27 is shunted. After a second interval of time, since 81A1 is opened when 81A drops out, contacts 82A1 close to shunt resistor 28. The dropout of 82A also opens the circuit for the voltage coil 8FW1 of relay 8FW and, as soon as the load current drops sufficiently to deenergize the current coil 8FW2 a given amount, the contact members of this load responsive relay open to decrease the excitation of field 4. The motor 25 is thus caused to operate at full speed.

It will be noted from the foregoing that the cutters are driven by adjustable speed constant voltage direct current motors, which provide the speed adjustment that is necessary to suit cutters of different diameters. The motors are reversed by manually operated switches (not shown) on the main control panel so that cutters of either hand can be accommodated. No braking control of any kind is provided for these cutter motors so that the cutters, in the event of a stopping of the machine, or an emergency stopping, or a voltage failure, will be operated by the momentum of the drive so that they will cut themselves free.

An emergency relay ER is provided for stopping the entire machine if for any reason emergency stopping is necessary. This relay is energized by closing switch 31 whereupon a circuit is established from bus 8 through stop switch 30, starting switch 31, protective devices 32, the emergency relay ER to the bus 10. Operation of this relay causes the closing of the contacts ER1, ER2, ER3, and ER4 and opening of contacts ER5.

The closure of contacts ER2 and ER3 connects buses 33 and 34 to buses 8 and 10, respectively, and the closing of contacts ER4 completes the holding circuit for emergency relay ER so that switch 31 may be opened. The utility of the operation of contacts ER1 and ER5 will appear hereinafter.

The devices 32, designated protective devices, include a considerable number of switches for stopping most of the motors that are part of this machine in case of any emergency, as voltage failure, overtravel of the feed motor to be discussed, overtravel of the propeller operating motor, movement of the tracer against an obstruction, or if the tracers fail off the pattern because the stroke limit switches are not properly set, etc.

If automatic cutting or forming of the workpiece is desired, the automatic cut switch 37 is operated to closed position whereupon a circuit is established from bus 33 through the automatic return limit switch 35, automatic return switch 36, the make contacts of switch 37, the low speed rheostat limit switch 38, stop switch 39, the closed contacts 8CR3 and the coil ACR to bus 34.

The relay ACR thereupon closes its contacts ACR1—7, inclusive, and opens its contacts ACR8 and ACR9. The relay is held in through contacts ACR3. Closure of contacts ACR1 establishes a circuit from bus 33 through switches 35 and 36, contacts ACR1, back contact RR4 of the return relay RR, and the coil CR of the cut relay CR to bus 34.

Operation of the cut relay Cr causes the closing of contacts CR1, CR2, and CR3 and the opening of contacts CR4, CR5, and CR6. Opening of contacts CR4 prevents the RR relay from being energized so that two inconsistent circuits can not be established. Similarly, opening of contacts CR5 and CR6 prevents the establishment of improper circuits at this stage of operation.

The closing of contacts CR1 establishes a circuit from bus 1 through switch 12, contact ACR4, low speed rheostat limit switch 40, contacts CR1 and ER1, conductor 41, cutter relief limit switch 14, relay 6TI to bus 5. Operation of relay 6TI closes the contacts 6TI thereby establishing a circuit from energized conductor 41 through contacts 6—03, contacts 6TI, coil of directional contactor 6I to bus 5. Relay 6TI is provided with a dashpot 6TID which has a similar function to dashpot 6TOD.

Operation of directional contactor 6—I causes the closing of contacts 6—I1 and 6—I2 and the opening of contacts 6—I3. The opening of contacts 6—I3 prevents the possibility of 6—0 becoming energized. The operation of directional contactor 6—I establishes a circuit from bus 1 through contacts 6—I1, the armature 15 of motor 16, 6—I2, series field 17, resistor 18 to bus 5. The motor 16 thus operates to move the cutters in. As soon as the cutters are at the "in" limit, the limit switches 14 and 13a are opened and the limit switches 13 and 14a are closed.

The opening of limit switch 14 stops the motor 16 and the cutters are thus at the "in" position ready, except for any cutter feed that may be necessary, to do useful work on the workpiece. The opening of limit switch 13a prevents the possibility of energizing the return directional contactor 3R. The closing of limit switch 13 does not establish a circuit for relay 6TO since return relay RR has not yet been energized so that contacts RR1 are open, and contacts ER5 and ACR8 are at this stage open.

At this stage of operation it may be appropriate to point out the value of the emergency relay in its relation to the cutter motor 25 and the cutter relief drive motor 16. If for any reason the emergency relay operates, the control buses 33 and 34 are immediately deenergized by the opening of contacts ER2 and ER3. Contacts ER5, however, close to establish a circuit through limit switch 13 to thus cause the motor 16 to move the cutters out. Since the cutter motor 25 is not provided with any braking feature, the momentum of the parts in the cutter motor drive keeps the cutters in operation long enough for the cutters to cut themselves free while they are at the same time being lifted away from the workpiece by motor 16. The protection is thus quite complete and reliable except possibly the relatively rare instantaneously voltage failure on buses 33 and 34.

As pointed out, the inward movement of the cutters toward the workpiece to their limit closes limit switch 14a. A circuit is thus established from bus 33 through contacts CR2, limit switch 14a, contacts ACR5 and directional contactors 3C to bus 34.

Operation of the directional contactor 3C causes the closing of the contacts 3C1-6, inclusive. Closure of contacts 3C1 does not, at this stage, as yet complete the closing of any circuits. Closure of contacts 3C3 and 3C4 establishes a circuit from bus 33 through contacts 3C3, all of the sections of the motor operated rheostat 42, the fixed resistor 43, the Wheatstone bridge arrangement 44 including the regulator generator 45 and other elements presently to be discussed, contacts 3C4 to bus 34. This means that the generator G, which is driven at a constant speed from a suitable induction motor not shown produces a voltage, and, as a result, the head stock motor M has its armature energized and operates at a slow speed since the rheostat 42 is assumed to be adjusted for the lowest speed.

The operation of the rheostat motor from its slow speed position also operates limit switch 134, disposed in Fig. 3b between limit switches 13a and 14a. This limit switch 134 is open only when the rheostat motor 49 has operated the rheostat 42 to the low speed position, but once the rheostat 42 is moved toward the higher speed positions limit switch 134 is closed. The full utility of this arrangement will appear hereinafter. Closure of contacts 3C1, however, does, the moment limit switch 134 is closed, establish a holding circuit for relay 3C regardless of the position of contacts CR2 and ACR5 and regardless of the position of limit switch 14a. Similarly when relay 3R is energized and limit switch 134 is closed this relay 3R remains energized regardless of the position of contacts RR2 and ACR6 and regardless of the position of limit switch 13a.

To better understand the entire system an explanation of the control for motor M at this point may be helpful.

In the practice of our invention, we provide a variable-voltage control in which the motor M is mechanically coupled to drive the arbor 106 and also the pattern P. The motor M is provided with a separately excited field winding F which is arranged to be energized in a single direction only. A generator G is provided having its armature substantially directly connected to the armature of the motor. The control of the speed and acceleration of the motor and in consequence the speed and acceleration of the ship propeller and the direction of movement of the ship propeller are effected by varying the amount and direction of excitation of the field windings 111 and 112 of the main generator. This control may be effected in a few or in many steps depending upon the type of operation that is desired.

In order to maintain the speed of the motor M at the various speed values corresponding to a specific adjustment of the controller 42 used for controlling the current flowing through the main field windings of the generator, we use a regulator-generator 45. This regulator-generator 45 is arranged to measure the speed and load of the motor and the current flowing through the main field windings 111 and 112 of the generator. The armature of the regulator-generator is arranged so that it may be connected in series circuit relation with a permanent resistor 113 and with the generator field windings 111 and 112, whereby the voltage generated in the armature in response to the speed and load of the motor and the current flowing through the generator field windings 111 and 112 will cause a current to flow through the main generator field windings 111 and 112, which current will be a function of the departure of the motor speed from a predetermined value, corresponding to the particular setting of the controller 42 for the main field windings.

Under certain load and operating conditions, no voltage will be generated in the armature of the regulator-generator 45, since under these conditions the speed of the motor M corresponds to the setting of the controller 42, that is, corresponds to the adjustment of rheostat 42. For all other conditions, however, a voltage will be generated in the armature of the regulator-generator in such a direction and of such a value as to cause a current to flow through the main field windings 111 and 112 of the generator G to operate the motor at the desired, or selected, speed.

In order to measure the speed of the motor M and load carried by the motor M, the regulator-generator R is provided with a series field winding 140 through which all or a portion of the current flowing from the generator G to the motor M flows. The regulator-generator is also provided with a main field winding 150 which is connected to be responsive to the voltage applied to the motor. These two field windings, namely, 140 and 150 are differentially related to each other, as indicated by the arrows adjacent these fields, so that the resulting flux is a function of the speed of the motor M as measured by the counter-electromotive force of the motor. That is, the magnetomotive force produced by the series field windings 140 is proportional to the IR drop of the motor armature, and the magnetomotive force produced by the main field winding 150 of the regulator-generator is proportional to the voltage impressed across the terminals of the armature of the motor M. Thus, the resulting flux due to the differential relationship between the two field windings is a function of the counter-electromotive force of the motor. Since this flux results from the combined action of the current flowing through the motor armature and the voltage applied thereto, it is also a function of the load carried by the motor. The voltage which is generated in the armature of the regulator-generator due to this resulting flux is then a function of the speed of the motor and the load carried thereby.

It is desirable that any change in the voltage of the generator caused by the voltage generated in the regulator-generator armature and effecting the current flow through the main field windings 111 and 112 of the generator G be immediately reflected in the voltage generated in the armature of the regulator-generator R. Such action is desired in order to prevent hunting of the system. As soon as a voltage appears in the armature of the regulator-generator indicating that the speed of the motor M has departed from the desired speed, a change in the flow of current through the main field windings 111 and 112 of the generator G takes place in such a direction as to tend to restore the speed of the motor to the desired speed. If some means is not provided for immediately effecting a corresponding change in the corrective voltage generated in the armature of the regulator-generator R, the resulting change in the effects of the series and main field windings 140 and 150 of the regulator-generator in response to the corrective effect will take place too late. As a result, the speed of the motor will be altered more than is desired and hunting will result.

In order to make the correction applied by the regulator-generator proportional to the departure of the speed of the motor from the desired speed corresponding to a particular setting of the controller for the main field windings 111 and 112 of the generator G, a pair of differential field windings 160 and 170 are provided in the regulator-generator. These field windings 160 and 170 are connected in series with the main generator field windings 111 and 112, respectively. Thus any change in current which flows through the main generator field windings 111 and 112 is immediately reflected in the voltage which is generated by the armature of the regulator-generator. It is then unnecessary to await the correction in the speed of the motor, as reflected in the change in the effects produced by the series and main field windings of the regulator-generator to correspondingly affect the voltage generated by the armature of the regulator-generator. The differential field windings 160 and 170 of the regulator-generator are arranged to produce an effect in the same direction as the effect produced by the series field winding 140 of the regulator-generator and, therefore, they oppose or are differentially related to the effect of the main field winding 150 of the regulator-generator. This is indicated by the direction of the horizontal arrows adjacent the fields 160 and 170.

There is always, then, a certain relationship between the speed and load of the motor and the corrective effect caused thereby in altering the flow of current through the main field windings of the generator. As a result, the system is free from hunting and the speed of the motor is maintained at predetermined values corresponding only to the changing positions of the rheostat arm of the rheostat 42.

Since the mass of the ship propeller SP is relatively great, it is desirable that the operation of motor M be so controlled that the propeller during reversing is stopped somewhat gradually and then gradually accelerated in the opposite direction. The motor 49 operating the rheostat 42 is so controlled that at each propeller starting position the rheostat 42 is in the low speed position shown. As the motor M is started, the motor 49 operates the rheostat 42 to the selected speed position for the particular direction of operation of the motor M. The rheostat 42 does not, however, remain in one of two selected positions for the respective directions of operation of motor M, but may alter its position over the entire range of operation depending on the load on the cutter motors 25 and 25'. The cutter motor load is, of course, affected by many factors, but one factor is the zero error position of the tracers 203 and 203'. This means that the speed of motor M is made a function of the positions of the tracers with reference to their zero positions and the load on the cutter motors. This zero position in a sense corresponds to a moving index, moving with the point on the pattern at which the tracers would have no zero error.

As has been stated hereinbefore, it is desirable to effect a corrective action in the current flowing through the main field windings 111 and 112 of the generator G by means of the regulator-generator 45, without altering the currents flowing through the main field windings 111 and 112 from the controller. It is then possible to maintain a precise relationship between the speed of the motor and the corresponding movement of the ship propeller and the various settings of the controller, regardless of the load on motor M or other variable conditions which otherwise would normally affect the operation of this motor.

We utilize a Wheatstone bridge arrangement with the control for machine tools to effect the desired independent control of the current flowing through the main field windings of the generator. We provide a Wheatstone bridge circuit in which the differential field windings 160 and 170 of the regulator-generator and the main generator field windings 111 and 112 are, respectively, connected in series circuit relation, and form all of two of the branches of the Wheatstone bridge circuit. The armature of the regulator-generator is connected across one pair of opposite terminals of the Wheatstone bridge circuit while the remaining pair of terminals is connected through some switches and through the controller 42 to an independent source of electrical energy. With such an arrangement, it is possible to vary the current flowing through the branches of the bridge containing the main field windings 111 and 112 of the generator G by means of the controller 42 independently of the current flow therethrough from the armature of the regulator-generator, and vice versa.

Resuming the detailed analysis, the closure of 3C2 establishes a circuit from bus 33 through contacts 3C2 and CR3, the back contacts 81L1, 21VR1, 82L, 22VR, limit switch 48 closed at the low speed position of the rheostat 42, and speed increase relay Inc to bus 34.

The operation of relay, or directional contactor Inc, causes the closing of contacts Inc1 and Inc2 whereupon a circuit is established from bus 8 through contacts Inc1, the rheostat motor 49, contacts Inc2 to bus 10.

The rheostat motor 49 thus operates to shunt out sections of rheostat 42. The speed of the head stock motor M is thus increased and the propeller blade is driven in such a direction as to start making a cut. As soon as the load on the cutter motor is at the desired value loading relay 82L operates to open its contacts 82L to open the circuit for the directional contactor Inc. The motor 49 is thus stopped at the proper speed for motor M. If the loading should drop, contacts 82L1 again close and motor 49 is again started to increase the speed of the motor M. Relay 82L in conjunction with the rheostat motor 48 thus controls the speed of motor M to just such value as to get maximum cutting speed.

If the tracer deflection is great with changes of the pattern contour, the voltage of generator 131 may rise above a given value. When this occurs, velocity responsive relay 21VR is energized and the operation of this relay also causes the opening of the circuit at contacts 21VR1 for the directional contactor Inc. The cutter is thus not too heavily loaded because of rapid changes in contour of the pattern in reference to the tracer movements. The cut thus continues subject to accurate control as to loading of the cutter motor, speed of the saddle motor, and tracer position.

If the cutter load is too great so that a decrease in speed of motor M should be made, the cutter loading control relay 81L operates to open its contacts 81L1 and close its contacts 81L2. A circuit is then established from bus 33 through contacts 3C2, CR3, and 81L2, limit switch 50 and the directional contactor Dec for decreasing the speed of motor M.

This decrease of the speed of motor M is accomplished by the changing of the rheostat position because operation of cutter motor loading control relay, when operated as just stated, opens the circuit for Inc at contacts 81L1, and the operation of Dec establishes a circuit from bus 8 through contacts Dec1, the rheostat motor 49, contact members Dec 2 to bus 10. The speed of motor M is thus both increased and decreased in inverse proportion to the load on the cutter motor and is also similarly increased and decreased in inverse proportion to the changes in the speed of the saddle motor. This latter control will be apparent from the function of velocity responsive relay 21VR. When the speed of the saddle motor is too great not only is the circuit for Inc interrupted at contacts 21VR1, but the contacts 21VR2 are closed whereupon the circuit for directional contactor Dec is energized.

From the circuits above traced, it will be noted that limit switch 50 was assumed to be closed. This assumption is correct, because limit switch 50 is open only in the lowest speed position of the rheostat 42 which is the position shown. For all other positions limit switch 50 is closed. This means the moment the rheostat is moved out of this low speed position limit switch 50 is closed. The arrangement of limit switch 48 is somewhat similar, namely, for all positions of the rheostat, except at or near the maximum speed position, limit switch 48 is closed.

It should be noted that the closure of contacts ACR1 makes it possible to start the ram feed motor. By operating switch 47, a circuit is established from bus 33 through the stop switch 46, the starting switch 47, contacts ACR1, and the coil of relay 4CR to bus 34. Operation of relay 4CR causes the closing of its contacts 4CR1 and 4CR2. The relay is held in through contacts 4CR1 and closure of contacts 4CR2 establishes a circuit from bus 33 through contacts 3C6 and 4CR2 and through the operating coil of the measuring relay MR to bus 34. The measuring relay clutch coil and relay FCR thus becomes energized. This relay thus closes its contact members FCR1 and FCR2.

The FCR relay holds itself in through contacts FCR2 so that the feeding is completed independent of the position of contacts 3C6.

Assuming that the successive cuts are to be made from the propeller hub outwardly, which corresponds more nearly with the position shown for the cutters, then, after the "set-up" of the machine which is done before automatic operation begins through operation of manually controlled inching switches not shown, the "feed-out" switch is closed. This means at the instant contacts FCR1 are closed a portion of the circuit for the ram feed motor control is closed but no feeding can as yet take place since RR2 is still open.

From the discussion hereinbefore given on the control for the saddle motor and motor M, it will be apparent that one complete cut is made as the propeller is rotated through an angle somewhat greater than the angular width of the propeller blade being cut. When one complete cut has been made, the limit switch 35 is opened.

The opening of the limit switch 35 causes the CR relay to be deenergized and this relay thereupon opens its contacts CR1, CR2, and CR3 and closes its contacts CR4, CR5, and CR6. Opening of contacts CR1 makes certain that relay 6T1 can not be energized and, therefore, the relief motor can not be energized to move in the "in" direction.

The opening of contacts CR2 opens one branch of the parallel circuits, including contacts CR2, limit switch 14a and contacts ACR5, and limit switch 134 and contacts 3C1, respectively. Since limit swith 134 is only open in the low speed position of the rheostat, relay 3C, for the time being, remains energized.

The deenergization of relay CR closes contacts CR6 and opens contacts CR3. Since the cutters are idle at the end of the stroke when limit switch 35 is operated the load responsive relay 81L is not energized and contacts 81L2 are open. The tracers will also not contact the pattern and will thus hold their zero position. The voltage of the generator 131 is thus zero and as a result voltage responsive relay 21VR is deenergized and the contacts 21VR2 are open. There is thus no chance of energizing the rheostat motor to move the rheostat to increase the speed of motor M.

The closure of contacts CR6 thus establishes a circuit from bus 33 through contacts 3C2, which are still closed at this stage, contacts CR6, limit switch 50, and relay Dec to bus 34. The rheostat motor 49 thus operates the rheostat toward the low speed position. When the rheostat is in the final low speed position limit switch 134 is opened and in consequence relay 3C is deenergized. This relay thus opens its contacts 3C1–6, inclusive. Opening of contact 3C1 makes certain 3C can not be reenergized when limit switch 134 is again closed.

The opening of 3C2 interrupts the circuit for Dec. The rheostat motor is thus stopped in the low speed position. The opening of contacts 3C3 and 3C4 removes the exciting circuit for generator G is thus interrupted and the head stock motor M is stopped.

The closure of contacts CR4 closes a circuit for the return relay RR. The circuit thus closed may be traced from bus 33, limit switch 51, the back contacts of the automatic cut push button 37, contacts ACR2 and CR4 and return relay RR to bus 34. While this directional contactor or return relay RR closes its contacts RR2 the reverse operation of motor M can not yet take place but must await the slowing down of the motor M and its final stopping by the procedure just discussed.

The operation of return relay RR also causes the closing of contacts RR1, and RR3 and the opening of contacts RR4 and RR5. The closure of RR1 establishes a circuit from bus 8 through automatic set-up switch 12, contacts ACR4, limit switch 40, contacts RR1, limit switch 13, relay 6TO to bus 10. As 6TO operates directional contactor 6—0 is energized through contacts 6TO and contacts 6—01 and 6—02 are closed to operate the suction face relief motor 16. This motor thus moves the cutters out of the way of the propeller blade so that the blade may proceed with the return movement, once the motor M is slowed down and then stopped.

From the operation of motor 16 earlier discussed and the statements just made, it is apparent that the relief motors are always operated to move the cutters away from the blade when the propeller blade is stopped or reversed and the cutters are only in the cutting position when all parts are ready to make a cut.

Once the rheostat motor is in its slow speed position limit switch 134 is, of course, opened but limit switch 13a is closed as shown, whereupon a circuit is established from bus 33 through contacts RR2, limit switch 13a, contacts ACR6 and the return directional contactor 3R. Another circuit is established from bus 33, contact members RR2, limit switch 13a, contacts FCR1, "feed out" switch, through directional contactor 4—0 to bus 34.

Operation of directional contactor 4—0 closes the contacts 4—01 and 4—02 thereby establishing a circuit from bus 1 through contacts 4—01, motor 52, contacts 4—02, series field 53, current limiting resistor 54 to bus 5. This motor thus operates to feed the ram out. The number of revolutions it makes is determined by the measuring relay MR. After a selected number of turns of motor 52 the contact members MR open and relay FCR is thus deenergized.

When FCR is deenergized, contacts FCR1 and FCR2 open. Opening of FCR1 stops the ram feed motor since 4—0 is deenergized and the opening of FCR2 prevents reenergization of MR until the cut stroke is again begun, when 3C6 will again be closed. If the "feed in" switch is closed the machine has to be set up so that successive cuts are made by working from the blade tip toward the propeller hub. For this type of cutter or ram feed operation the closure of RR2 will close a circuit for directional contactor 4—I and cause the closure of a reverse circuit for motor 52 through contact members 4—I1 and 4—I2.

Almost simultaneous with the ram feed operation the head stock motor is caused to operate in reverse direction. The circuit for the reverse operation is effected through the operation of 3R which closes its contacts 3R1, 3R2, 3R3, 3R4 and 3R5. Closure of contacts 3R3 and 3R4 reverses the excitation for generator G. The closure of 3R1 makes it possible to maintain energization of 3R when limit switch 134 is closed, regardless of the positions of contacts RRL and ACR6 or the position of limit switch 13a.

The closure of contacts 3R2 establishes a circuit from bus 33 through contacts 3R2, RR3, 81L1, 21VR1, 82L, 22VR, limit switch 48, and the Inc directional contactor to bus 34. Since 3R5 is closed, the velocity responsive relay 22VR (see Fig. 2b) is energized and, in the event excessive speeds of the saddle motor because of high incremental errors of the tracer on the pattern, relay 22VR limits the speed setting of the rheostat exactly as did relay 21VR during the cutting stroke. Since the cutter drive motor is not likely to be heavily loaded during the non-cutting return stroke loading relays 81L and 82L are not likely to open their contacts. The incremental tracer position error, or zero, is also not likely to be great. As a consequence, the rheostat will be moved to its maximum speed position. The propeller blade is therefore, rapidly returned to its initial position. When the propeller blade is moved to the end of its return stroke, the limit switch 51 opens deenergizing RR to close contact members RR4. The circuit is then reestablished for relay CR and the entire cutting cycle is repeated.

We are, of course, aware that others, particularly after having had the benefit of our disclosure may devise electric systems of control for accomplishing the same or similar results. We, therefore, do not wish to be limited to the specific showings made but we wish to be limited only by the scope of the claims hereto appended.

We claim as our invention:

1. In a system of control for controlling the excitation of a generator, in combination, a main generator having an armature winding and having a pair of field windings connected in two opposite legs of a balanced Wheatstone bridge, a load connected in series with the generator armature winding, a regulator generator connected in series with the armature of the regulator generator connected across two of the junctions of the Wheatstone bridge, said regulator generator having a pair of field windings connected respectively across the generator terminals and in the load circuit and a pair of field windings one connected in one leg of the bridge in series with one of the generator field windings and the other connected in the opposite leg of the bridge in series with the other field winding of the main generator, a pair of bridge balancing resistors connected in the other two opposite legs of the bridge, a source of variable direct current voltage connected across the other two junctions of the bridge, a motor, means responsive to the load on said motor for varying said source of variable direct current voltage.

2. In a system of control for controlling the excitation of a generator, in combination, a main generator having an armature winding and having a pair of field windings connected in two opposite legs of a balanced Wheatstone bridge, a load connected in series with the generator armature winding, a regulator generator connected in series with the armature of the regulator generator connected across two of the junctions of the Wheatstone bridge, said regulator generator having a pair of field windings connected respectively across the generator terminals and in the load circuit and a pair of field windings one connected in one leg of the bridge in series with one of the generator field windings and the other connected in the opposite leg of the bridge in series with the other field winding of the main generator, a pair of bridge balancing resistors connected in the other two opposite legs of the bridge, a motor, a second motor, a source of direct current voltage, means responsive to the load current of the first motor and the angular position of the rotor portion of the second motor with reference to an index for varying the voltage of said source of direct current.

3. In a system of control for controlling the excitation of a generator, in combination, a main generator having an armature winding and having a pair of relatively low impedance field windings connected in two opposite legs of a balanced Wheatstone bridge, a load connected in series with the generator armature winding, a regulator generator, an adjustable resistor connected in series with the armature of the regulator generator connected across two of the junctions of the Wheatstone bridge, said regulator generator having a pair of field windings connected respectively across the generator terminals and in the load circuit, and a pair of field windings, one connected in one leg of the bridge in series with one of the low impedance main generator field windings and the other connected in the opposite leg of the bridge in series with the other of the low impedance main generator field windings, a pair of bridge balancing resistors connected in the other two opposite legs of the bridge, an electric circuit subject to electric load, a source of direct current voltage, and means responsive to the load current of said electric circuit for varying the voltage of said source of direct current, said source of direct current being connected across the other two junctions of the bridge.

4. In a system of control for controlling the excitation of a generator, in combination, a main generator having an armature winding and having a pair of relatively low impedance field windings connected in two opposite legs of a balanced Wheatstone bridge, a load connected in series with the generator armature winding, a regulator generator, an adjustable resistor connected in series with the armature of the regulator generator connected across two of the junctions of tne Wheatstone bridge, said regulator generator having a pair of field windings connected respectively across the generator terminals and in the load circuit, and a pair of field windings, one connected in one leg of the bridge in series with one of the low impedance main generator field windings and the other connected in the opposite leg of the bridge in series with the other of the low impedance main generator field windings, a pair of bridge balancing resistors connected in the other two opposite legs of the bridge, an electric circuit connected to an electric load, an electric motor, a source of direct current voltage, the means responsive to the load current of said electric circuit and the angular position of the rotor element of said motor for varying the voltage of said source of direct current, said source of direct current voltage being connected across the other two junctions of the bridge.

5. In a system of control for controlling the excitation of a generator, in combination, a main generator having an armature winding and having a pair of field windings connected in two opposite legs of a balanced Wheatstone bridge, a load circuit connected in series with said armature winding, a regulator generator and a resistor connected in series with the armature of the regulator generator connected across two of the junctions of the Wheatstone bridge, said regulator generator having a pair of field windings connected respectively in the load circuit of said generator and across the generator terminals and having a pair of field windings, one connected in one leg of the bridge in series with one of the field windings of the main generator, and the other connected in the opposite leg of the bridge in series with the other field winding of the main generator, a pair of bridge balancing resistors connected in the other two opposite legs of the bridge, a pair of electrically independent electric circuits, a source of direct current voltage, means responsive to operating characteristics in both of said electric circuits for varying the voltage of said source of direct current, said source of direct current being connected across the other two junctions of the bridge.

6. In a system of control for controlling the excitation of a generator, in combination, a main generator having an armature winding and having a pair of relatively low impedance field windings connected in two opposite legs of a balanced Whaetstone bridge, a load circuit connected in series with said armature winding, a regulator generator and an adjustable resistor connected in series with the armature of the regulator generator connected across two of the junctions of the Wheatstone bridge, said regulator generator having a pair of field windings connected respectively in the load circuit of said generator and across the generator terminals and having a pair of field windings, one connected in one leg of the bridge in series with one of the low impedance main generator field windings, and the other connected in the opposite leg of the bridge in series with the other low impedance main generator field windings, a pair of bridge balancing resistors connected in the other two opposite legs of the bridge, a source of direct current voltage, a pair of electrically independent electrical circuits, and means responsive to electrical characteristics in said independent electrical circuits for controlling the voltage of said source of direct current power, said source of direct current power being connected across the other two junctions of the bridge.

7. In a system of control for a motor, in combination, a generator having a pair of field windings, a motor substantially of the capacity of the generator directly connected to the generator, said motor having a field winding, a source of direct current, a controller adapted to reverse the connection of two generator field windings to said source of direct current, a regulator generator having an armature winding, a resistor in series with the armature winding and four field windings, a balanced Wheatstone bridge circuit having two of its junctions connected through the controller to the source of direct current and having the armature of the regulator generator and the resistor in series with it connected across the other two, or no voltage, junctions of the bridge, said Wheatstone bridge including only one generator field winding and one of the field windings of the main generator in one leg and only the other regulator generator field winding and the other field winding of the main generator in the opposite leg, and including a pair of resistors in the other two opposite legs, the remaining two field windings of the regulator generator being connected respectively to the generator terminals and in the armature circuit of the generator and motor, a second motor, and a third motor, means responsive to the load current of the second motor for controlling the operation of said controller to vary the voltage of said source of direct current voltage, and means responsive to the angular position of the rotor of said third motor with reference to an index for also modifying the operation of said controller.

8. In a system of control for a motor, in combination, a generator having a pair of field windings, a motor substantially of the capacity of the generator directly connected to the generator, said motor having a field winding, a source of direct current, a controller adapted to reverse the connection of two generator field windings to said source of direct current, a regulator generator having an armature winding, a resistor in series with the armature winding and four field windings, a balanced Wheatstone bridge circuit having two of its junctions connected through the controller to the source of direct current and having the armature of the regulator generator and the resistor in series with it connected across the other two, or no voltage, junctions of the bridge, said Wheatstone bridge including only one generator field winding and one of the field windings of the main generator in one leg and only the other regulator generator field winding and the other field winding of the main generator in the opposite leg, and including a pair of resistors in the other two opposite legs, the remaining two field windings of the regulator generator being connected respectively to the generator terminals and in the armature circuit of the generator and motor, a second motor, means responsive to the load current of said second motor for modifying the operation of said controller to thus vary the voltage of said source of direct current as a function of the load current of said second motor.

9. In a system of control for a motor, in combination, a generator having a pair of field windings, a motor substantially of the capacity of the generator directly connected to the generator, said motor having a field winding, a source of direct current, a controller adapted to reverse the connection of two generator field windings to said source of direct current, a regulator generator having an armature winding, a resistor in series with the armature winding and four field windings, a balanced Wheatstone bridge circuit having two of its junctions connected through the controller to the source of direct current and having the armature of the regulator generator and the resistor in series with it connected across the other two, or no voltage, junctions of the bridge, said Wheatstone bridge including only one generator field winding and one of the field windings of the main generator in one leg and only the other regulator generator field winding and the other field winding of the main generator in the opposite leg, and including a pair of resistors in the other two opposite legs, the remaining two field windings of the regulator generator being connected respectively to the generator terminals and in the armature circuit of the generator and motor, a second motor having a rotor element disposed to be in a given position during normal operation of the system of control, and means responsive to a deviation of the rotor element of said second motor from its normal position for modifying the operation of said controller to thus make the voltage of said source of direct current a function of the operation of said second motor.

10. In a system of control for controlling the voltage of a generator, the subcombination of a main generator, a Wheatstone bridge including a regulator generator connected across two of the junctions of the bridge, a generator field winding and a field winding of the regulator generator connected in one leg of the bridge, a second field winding of the main generator and a field winding of the regulator generator connected in the opposite leg of the Wheatstone bridge, a pair of resistors in the two other opposite legs of the bridge, two regulator field windings connected respectively to be responsive to the regulator voltage and the regulator load current, electric circuit means, a source of direct current voltage disposed to be connected to the junctions of the Wheatstone bridge through which the regulator generator is not connected, and means responsive to electrical characteristics of said electric circuit means for controlling the voltage of said source of direct current.

11. In a system of control for controlling the voltage of a generator, the subcombination, a main generator, a Wheatstone bridge including a regulator generator connected across two of the junctions of the bridge, an electric load circuit, a source of direct current power connected across the two other junctions of the bridge, means responsive to the load current of said electric load circuit for varying the voltage of said direct current power, a low impedance main generator field winding and a field winding for the regulator generator connected in one leg of the bridge, a second low impedance generator field winding and a second field winding of the regulator generator connected in the opposite leg of the Wheatstone bridge, a pair of resistors in the two other opposite legs of the bridge, and two regulator generator field windings connected respectively to be responsive to the voltage of the main generator and the load current of the main generator.

12. In a system of control, in combination, a Wheatstone bridge, a pair of adjustable resistors in each of two of the oppositely disposed branches of the bridge, a pair of generators, one of said generators having four field windings and the other of said generators having at least two field windings, one of the field windings of the first generator and one of the field windings of the second generator constituting all of one branch of the Wheatstone bridge and a second field winding of the first generator and the other field winding of the second generator constituting all of the remaining branch of the Wheatstone bridge, the one of said generators having four field windings being connected to two of the junctions of said Wheatstone bridge, a source of direct current connected to the other two junctions of the Wheatstone bridge, electric circuit means, means responsive to electrical characteristics of said electric circuit means for controlling the voltage of the source of direct current power connected to the two other junctions of the Wheatstone bridge, said other generator being connected to a load and the remaining two field windings of the generator having the four field windings being connected to be responsive respectively to the voltage and the load of the generator having two field windings.

13. In a system of control, in combination, a Wheatstone bridge, a pair of adjustable resistors in each of two of the oppositely disposed branches of the bridge, a pair of generators, one of said generators having four field windings and the other of said generators having at least two field windings, one of the field windings of the first generator and one of the field windings of the second generator constituting all of one branch of the Wheatstone bridge and a second field winding of the first generator and the other field winding of the second generator constituting all of the remaining branch of the Wheatstone bridge, a source of direct current power, a motor connected to drive a load, a second motor having a rotor element normally in a given position, means responsive to the load current of the first motor for controlling the voltage of said source of direct current power, and means responsive to the movement of the rotor element of the second motor from its normal position for also controlling the voltage of said source of direct current power, the one of said generators having the four field windings being connected to two of the junctions of said Wheatstone bridge and the other of the generators being connected to a load, and the remaining two field windings of the generator having the four field windings being connected to be responsive respectively to the voltage and the load of the generator having the two field windings.

14. In a system of control, in combination, a Wheatstone bridge, a pair of adjustable resistors in each of two of the oppositely disposed branches of the bridge, a pair of generators, one of said generators having four field windings and the other of said generators having at least two field windings, one of the field windings of the first generator and one of the field windings of the second generator constituting all of one branch of the Wheatstone bridge and a second field winding of the first generator and the other field winding of the second generator constituting all of the remaining branch of the Wheatstone bridge, the one of said generators having four field windings being connected to two of the junctions of said Wheatstone bridge, a source of direct current power connected to the other two junctions of the Wheatstone bridge, a motor connected to a load, means responsive to the load current of said motor for controlling the voltage of said source of direct current power, the generator having the two field windings being connected to a load and the remaining two field windings of the generator having four field windings being connected to be responsive respectively to the voltage and the load of the generator having two field windings.

15. In a system of control, in combination, a pair of adjustable resistors in each of two of the oppositely disposed branches, a pair of generators, one of said generators having four field windings and the other of said generators having at least two relatively low impedance field windings, one of the field windings of the first generator and one of the low impedance field windings of the second generator constituting all of one branch of the Wheatstone bridge, and the second field winding of the first generator and the other low impedance field winding of the second generator constituting all of the remaining branch of the Wheatstone bridge, the one of said generators having the four field windings being connected to two of the junctions of said Wheatstone bridge, a source of direct current power connected to the other two junctions of the Wheatstone bridge, means for reversing the polarity of said source of direct current power with reference to the junctions of the Wheatstone bridge to which it is connected, an electric load circuit, means responsive to the load current of said electric load circuit for controlling the voltage of said source of direct current power when said source of direct current power is connected to said two other junctions of the bridge with one polarity, and means responsive to the load current of said load circuit for controlling the voltage of said source of direct current power in a different manner when said source of direct current power is connected to the other two junctions of said bridge with a different polarity, said other generator being connected to a load and the remaining two field windings of the generator having four field windings being connected to be responsive respectively to the voltage and the load of the generator having the two field windings.

16. In a system of control, in combination, a Wheatstone bridge, a pair of adjustable resistors connected in each of two of the oppositely disposed branches of the bridge, a pair of generators, one of said generators having four field windings and the other of said generators having two field windings, one of the field windings of the first generator and one of the field windings of the second generator constituting all of one branch of the Wheatstone bridge, and a second field winding of the first generator and the other field winding of the second generator constituting all of the remaining branch of the Wheatstone bridge, the one of said generators having four field windings being connected to two of the junctions of said Wheatstone bridge, a source of direct current power connected to the other two junctions of said Wheatstone bridge, means for reversing the polarity of said source of direct current power with reference to the junctions of the Wheatstone bridge to which it is connected, an electric load circuit, means responsive to a given load of said load circuit for controlling the voltage of said source of direct current power when connected with one polarity to the junctions of said bridge and responsive to a different load current for controlling the voltage of said direct current power when connected with opposite polarity with the junctions of the bridge to which it is connected, a motor having a rotor element normally in a given position, and means responsive to a departure of the rotor element of said motor from its given position for also controlling the voltage of said source of direct current power, the other generator being connected to a load and the remaining two field windings of the generator having four filed windings being connected to be responsive respectively to the voltage of the load of the generator having two field windings.

17. In a system of control, in combination, a generator drive at a selected speed, a motor connected to be energized by said generator, a second motor connected to drive a load, a third motor having a rotor element normally holding a given position with reference to its stator element, means responsive to the operating characteristics of the second and third motor and the voltage excitation current and load current of the generator for controlling the excitation of the said generator.

18. In a system of control, a main generator, a main motor connected to the generator to be operated thereby, a second motor connected to operate a load, a source of direct current power for exciting said generator, means responsive to the load current of the main motor for modifying the voltage of said source of direct current power, means responsive to the voltage of said generator for modifying the voltage of said source of direct current power, means responsive to the excitation of said generator for modifying the voltage of said source of direct current power, and means responsive to the load current of said second motor for also modifying the voltage of said source of direct current power.

19. In a system of control, in combination, a generator operated at a given speed from a suitable prime mover, said generator having field windings for exciting said generator, a motor, means responsive to the load current of said motor, the load current of said generator, and the voltage and excitation current of said generator for controlling the excitation of the field winding of said generator.

20. In a system of control, in combination, a generator operated from a suitable prime mover, a load connected to said generator, a motor having a rotor element disposed to hold a given position with reference to a stator element, and means responsive to the departure of the rotor element from its given position with reference to its stator element for controlling the excitation of said generator.

21. In a system of control, in combination, a main generator having field winding, a regulator generator and a source of direct current power interconnected with the field winding of said generator, said regulator generator having a field winding responsive to the load current of the generator, a field winding responsive to the voltage of the generator and a field winding responsive to the excitation current of said generator for modifying the excitation current supplied to said generator from said source of direct current power, a motor, a load connected to the motor, means responsive to the load current of said motor for controlling the excitation of said direct current source of power.

22. In a system of control, in combination, a main generator having field windings, a regulator generator and a source of direct current power interconnected with the field winding of said generator, said regulator generator having a field winding responsive to the load current of the generator, a field winding responsive to the voltage of the generator and a field winding responsive to the excitation current of said generator for modifying the excitation current supplied to said generator from said source of direct current power, a motor having a rotor element normally holding a given position with reference to the stator element, means responsive to the departure of said rotor element from its normal position for modifying the voltage of said direct current source of power.

23. In a system of control, in combination, a main generator having field windings, a regulator generator and a source of direct current power interconnected with the field winding of said generator, said regulator generator having a field winding responsive to the load current of the generator, a field winding responsive to the voltage of the generator and a field winding responsive to the excitation current of said generator for modifying the excitation current supplied to said generator from said source of direct current power, a motor, a load connected to the motor, means responsive to the load current of the motor for modifying the voltage of said source of direct current power, a second motor having a rotor element normally holding a given position with reference to its stator element, means responsive to a departure of the rotor element from said normal position for also modifying the voltage of said source of direct current power.

24. In a system of control for a machine tool, in combination, a main motor for operating a workpiece forming tool, saddle means for moving the tool in relation to the workpiece, a forming motor for operating the workpiece forming tool, a saddle means drive motor for moving the saddle means, a generator connected to energize the main motor, a source of excitation for the generator, control means for varying the voltage of the source of generator excitation to correspond to the load on the forming motor, modifying control means responsive to an operating characteristic of the motor operating the saddle means for modifying the operation of said control means as a function of said operating characteristic, and a regulating source of voltage for producing a voltage component to the source of excitation to make the effective voltage impressed on the main motor a function of the control means only.

25. In an electric system of control, in combination, a main motor; means for exciting the main motor at a constant value, a main generator connected to operate said main motor; a regulator generator excited as a function of the main motor load, the voltage impressed on the main motor, and the excitation of the main generator to thus furnish an excitation component to the main generator to make the excitation for the main generator independent of the load on the main motor, the ambient temperature, the direction of operation of the main motor; a second source of excitation for the main generator; a second motor; and means responsive to the load on the second motor for modifying the voltage output of the second source of excitation.

26. In an electric system of control, in combination, a main motor; means for exciting the main motor at a constant value; a main generator connected to operate said main motor; a regulator generator excited as a function of the main motor load, the voltage impressed on the main motor, and the excitation of the main generator to thus furnish an excitation component to the main generator to make the excitation for the main generator independent of the load on the main motor, the ambient temperature, the direction of operation of the main motor; a second source of excitation for the main generator; a second motor, means responsive to the load on the second motor for modifying the voltage output of the second source of excitation, a third motor; and means responsive to the operation of the third motor also modifying the voltage output of the second source of excitation.

GEORGE E. KING.
OREN G. RUTEMILLER.